US012659293B2

(12) United States Patent
Simon, Jr. et al.

(10) Patent No.: US 12,659,293 B2
(45) Date of Patent: Jun. 16, 2026

(54) SYSTEM AND METHOD FOR REDUCING LATENCY AND IMPROVING SECURITY IN OBLIVIOUS DOMAIN NAME SYSTEM TRAFFIC

(71) Applicant: T-MOBILE INNOVATIONS LLC, Overland Park, KS (US)

(72) Inventors: Jeffrey Scott Simon, Jr., Issaquah, WA (US); Geoffrey Todd Gibson, Ben Wheeler, TX (US); Gaurav Madan, Issaquah, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/753,692

(22) Filed: Jun. 25, 2024

(65) Prior Publication Data

US 2025/0392563 A1     Dec. 25, 2025

(51) Int. Cl.
*H04L 61/4511* (2022.01)
*H04L 61/5007* (2022.01)
*H04L 101/618* (2022.01)

(52) U.S. Cl.
CPC ...... *H04L 61/4511* (2022.05); *H04L 61/5007* (2022.05); *H04L 2101/618* (2022.05)

(58) Field of Classification Search
CPC ... H04L 65/764; H04L 65/762; H04L 65/403; H04N 1/32144; H04N 21/8458

USPC ........................................................ 709/245
See application file for complete search history.

(56) References Cited

U.S. PATENT DOCUMENTS

| | | | | |
|---|---|---|---|---|
| 6,640,251 B1 * | 10/2003 | Wiget | ................... | H04L 12/185 |
| | | | | 709/228 |
| 7,334,049 B1 * | 2/2008 | Somasundaram | ...... | H04L 69/22 |
| | | | | 709/227 |
| 7,924,832 B2 * | 4/2011 | Li | ........................... | H04W 8/26 |
| | | | | 709/245 |
| 8,151,002 B2 * | 4/2012 | Suzuki | ................... | H04L 61/251 |
| | | | | 709/245 |
| 8,897,183 B2 * | 11/2014 | Andreasen | .......... | H04L 12/4633 |
| | | | | 370/254 |
| 2002/0120782 A1 * | 8/2002 | Dillon | ................... | H04L 67/563 |
| | | | | 709/245 |
| 2023/0412558 A1 * | 12/2023 | Lohmar | .............. | H04L 61/2591 |
| 2024/0031231 A1 * | 1/2024 | Karampatsis | ....... | H04L 41/0893 |

* cited by examiner

*Primary Examiner* — Ruolei Zong
(74) *Attorney, Agent, or Firm* — SHOOK, HARDY & BACON L.L.P.; Elena K. McFarland

(57) ABSTRACT

Aspects herein provide systems, devices, methods, and media for leveraging a carrier device in a telecommunications network in order to implement Oblivious Domain Name System (DNS) traffic over Hypertext Transfer Protocol Secure (HTTPS), without requiring an intermediary proxy device. In aspects, a carrier device modifies DNS requests and DNS responses to anonymize identifying information prior to receipt by a DNS resolver and/or DNS server.

16 Claims, 3 Drawing Sheets

300

MEMORY

312

PROCESSOR(S)

314

PRESENTATION
COMPONENT(S)

316

RADIO(S)

324

310

I/O PORT(S)

318

I/O COMPONENTS

320

POWER SUPPLY

322

SYSTEM AND METHOD FOR REDUCING LATENCY AND IMPROVING SECURITY IN OBLIVIOUS DOMAIN NAME SYSTEM TRAFFIC

SUMMARY

A high-level overview of various aspects of the disclosure is provided here to offer an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

Aspects herein include a system, device, method, and media for reducing latency when implementing Oblivious Domain Name System traffic over Hypertext Transfer Protocol Secure in a telecommunications network, without requiring an intermediary proxy device as is otherwise required by other technologies. Other technologies require an intermediary proxy device when implementing Oblivious Domain Name System traffic over Hypertext Transfer Protocol Secure.

In one aspect, a computerized method is provided. A Domain Name System request is received from a user device. A modified Domain Name System request is then generated by a carrier device, in such aspects. The modified Domain Name System request is communicated from the carrier device to a Domain Name System resolver, in some aspects, directly. In response to the modified Domain Name System request, a Domain Name System response is received from the Domain Name System resolver, in various aspects. The carrier device generates a modified Domain Name System response, in aspects. The modified Domain Name System response is then communicated from the carrier device to the user device.

In another aspect, one or more non-transitory computer-readable media are provided that store instructions, that when executed via one or more processors, perform a computerized method. In such aspects, a Domain Name System request is received from a user device. A Network Address Translation (NAT) device generates a modified Domain Name System request by changing a source Internet Protocol (IP) address that corresponds to the user device in the Domain Name System request to a NAT device IP address, in some aspects. Although a NAT device is addressed herein, it will be understood from this Description that any gateway device that incorporates and performs various NAT (e.g., static or dynamic IP address to IP address translation) mechanisms and/or various Port Address Translation (PAT) mechanisms (e.g., static or dynamic IP to TCP or UDP port number translations), are contemplated and are considered to be within the scope of the aspects herein. Accordingly a NAT device is referenced for simplicity, but the term should not be used to limit the aspects herein to a NAT device; but rather, a NAT device might be swapped out for a PAT device, or another gateway device configured to perform NAT and PAT.

Then, the modified Domain Name System request is communicated to a Domain Name System resolver. In aspects, a Domain Name System response is received from the Domain Name System resolver. The NAT device generates, in aspects, a modified Domain Name System response by changing a destination IP address that corresponds to the NAT device in the Domain Name System response to an IP address associated with the user device. The modified Domain Name System response is communicated to the user device.

In yet another aspect, a system is provided. The system includes a Network Address Translation (NAT) device (or a gateway configured to perform NAT and/or PAT) associated with a carrier, in aspects. The NAT device is configured to receive, over Hypertext Transfer Protocol Secure (HTTPS), a Domain Name System request from a user device. The NAT device generates a modified Domain Name System request by applying a many-to-one translation to a source IP address that is associated with the user device, in some aspects. The modified Domain Name System request is then communicated to a Domain Name System resolver. A Domain Name System response is received from the Domain Name System resolver, in aspects. A modified Domain Name System response is then generated by the NAT device. The modified Domain Name System is communicated, over HTTPS, to the user device.

BRIEF DESCRIPTION OF THE DRAWINGS

Aspects are described in detail below with reference to the attached drawings figures, wherein.

DETAILED DESCRIPTION

Figure 1:
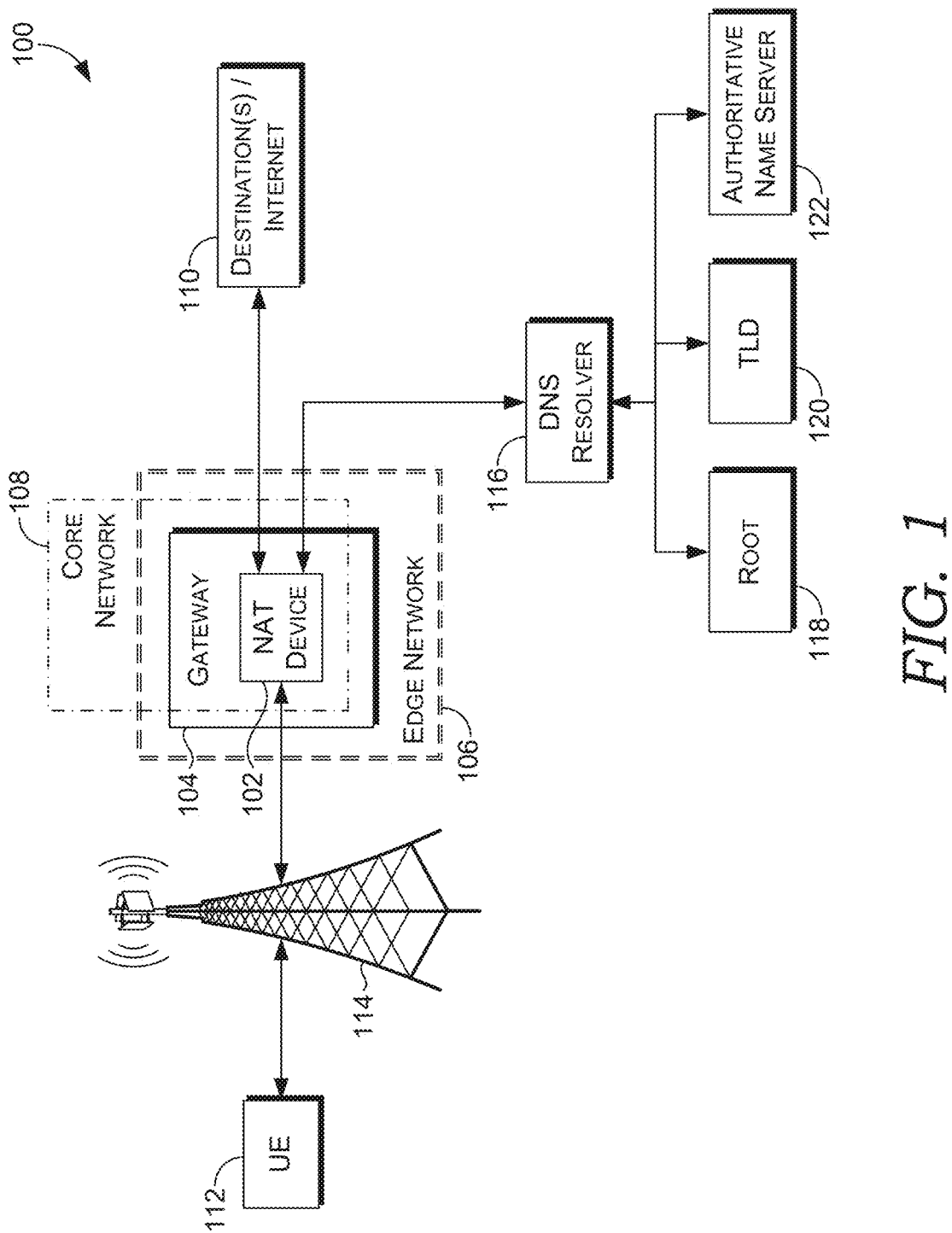
FIG. 1 depicts an example of a system environment, in accordance with one or more aspects.

The subject matter of the present disclosure is being described with specificity herein to meet statutory requirements. However, the description itself is not intended to limit the scope of this patent. Rather, the claimed subject matter might also be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of systems and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present disclosure can be embodied in many different forms and should not be construed as limited to the embodiments and aspects set forth herein.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present disclosure. The following is a list of these acronyms:

3G Third-Generation Wireless Access Technology
4G Fourth-Generation Wireless Access Technology 5G/5G NR Fifth-Generation Wireless Access Technology/New Radio 5GC Fifth-Generation Wireless Access Technology Core Network AAU Active Antenna Unit BRS Broadband Radio Service CD-ROM Compact Disk Read-Only Memory CDMA Code-Division Multiple Access eNodeB Evolved Node B EVDO Evolution-Data Optimized GIS Geographic/Geographical/Geospatial Information System gNodeB/gNB Next Generation Node B GPRS General Packet Radio Service GSM Global System for Mobile Communication iDEN Integrated Digital Enhanced Network DVD Digital Versatile Disc EEPROM Electrically Erasable Programmable Read-Only Memory IOT Internet of Things IIOT Industry Internet of Things IP Internet Protocol LED Light-Emitting Diode LTE Long-Term Evolution MEC Mobile Far-Edge Computer MIMO Multiple-Input Multiple-Output mMIMO Massive Multiple-Input Multiple-Output MMU Massive Multiple-Input Multiple-Output Unit NR New Radio PC Personal Computer PCS Personal Communications Service PDA Personal Digital Assistant PLMN Public Land Mobile Network RAN Radio Access Network RAM Random-Access Memory RF Radio Frequency RIC Radio Intelligent Controller ROM Read-Only Memory RRU Remote Radio Unit RU Radio Unit TDMA Time-Division Multiple Access TXRU Transceiver (or Transceiver Unit)

UE User Equipment

UMTS Universal Mobile Telecommunications System

UTRAN UMTS Radio Access Network

E-UTRAN Evolved Universal Mobile Telecommunications System

WCD Wireless Communication Device (interchangeable with UE)

WLAN Wireless Local Area Network

Further, various technical terms are used throughout this description. An illustrative resource that fleshes out various aspects of these terms can be found in *Newton's Telecom Dictionary*, 25th Edition (2009).

Aspects herein may be embodied as, among other things: a method, system, or set of instructions embodied on one or more computer-readable media. Aspects may take the form of a hardware aspect or an aspect combining software and hardware. Some aspects may take the form of a computer program product that includes computer-useable or computer-executable instructions embodied on one or more computer-readable media.

Definitions

"Computer-readable media" can be any available media and may include volatile and non-volatile media, as well as removable and non-removable media. By way of example, and not limitation, computer-readable media may include computer storage media and communication media. Computer-readable media may include both volatile and non-volatile media, removable and non-removable media, and may include media readable by a database, a switch, and various other network devices. Computer-readable media includes media implemented in any way for storing information. Examples of stored information include computer-useable instructions, data structures, program modules, and other data representations.

"Computer storage media" may include, without limitation, volatile and non-volatile media, as well as removable and non-removable media, implemented in any method or technology for the storage of information, such as computer-readable instructions, data structures, program modules, or other data. In this regard, computer storage media may include, but is not limited to, RAM, ROM, Electrically Erasable Programmable Read-Only Memory (EEPROM), flash memory or other memory technology, CD-ROM, DVD, holographic media, other optical disk storage, magnetic cassettes, magnetic tape, magnetic disk storage or other magnetic storage device, or any other medium that can be used to store the desired information and which may be accessed by the device 300 shown in FIG. 300. These technologies can store data momentarily, temporarily, or permanently.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner so as to encode information in the signal. By way of example, and not limitation, communication media includes wired media such as a wired network or direct-wired connection, and wireless media such as acoustic, radio frequency (RF), infrared, and other wireless media. Combinations of any of the above may also be included within the scope of computer-readable media.

The term "application" refers to software, a computer program, and/or an application programming interface that may be run by executing, by a processor, computer-readable instructions stored on memory for running the software. Examples of applications include social media applications, word processing applications, gaming applications, messaging applications, video-streaming applications, and more, for example, as run on user devices.

"Network" refers to a network comprised of wireless and wired components that provide wireless communications service coverage, for example, to one or more user devices. For example, the network may include one or more, or a plurality of, wireless networks, hardwired networks, telecommunications networks, peer-to-peer networks, distributed networks, and/or any combination thereof. The network may comprise one or more access points, one or more cell sites (i.e., managed by an access point), one or more structures such as cell towers (i.e., having an antenna) associated with each access point and/or cell site, a gateway, a backhaul data center, a server that connects two or more access points, a database, a power supply, sensors, and other components not discussed herein, in various aspects. Examples of a network include a telecommunications network (e.g., 3G, 4G, 5G, CDMA, CDMA 1XA, GPRS, EVDO, TDMA, GSM, LTE, and/or LTE Advanced) and/or a satellite network (e.g., Low Earth Orbit [LEO], Medium Earth Orbit [MEO], or geostationary). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMAX) network, and/or an ad hoc (mesh) network. The network may include or may communicate with a physical location component for determining a geographic location of an item, package, parcel, personnel, vehicle, end-point location, etc., by leveraging, for example, a Global Positioning System (GPS), Global'naya Navigatsionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity [SOP]).

"Access point" and "base station" are used interchangeably herein to reference hardware, software, devices, or other components for a communications device or structure having an antenna, an antenna array, a radio, a transceiver, and/or a controller. An access point can be deployed terrestrially at or near the Earth's surface, or within the atmosphere, for example, to orbit the Earth. For example, an "aerospace access point" may be a satellite deployed to orbit the Earth within or above the atmosphere (e.g., in the thermosphere or exosphere), whereas a "terrestrial access point" may be a fixed or semi-fixed base station located on the Earth's surface or upon any structure located on the surface. As discussed herein, an access point is a device comprised of hardware and complex software that is deployed in a network so that the access point can control and facilitate, via one or more antennas or antenna arrays, the broadcast, transmission, synchronization, and receipt of wireless signals in order to communicate with, verify, authenticate, and provide wireless communications service coverage to one or more user devices that request to join and/or are connected to the network. Generally, an access point can communicate directly with one or more user devices according to one or more access technologies (e.g., 3G, 4G, LTE, 5G, and mMIMO). An example of an aerospace access point includes a satellite. Examples of a terrestrial access point include a base station, an eNodeB, a gNodeB, a macrocell, a small cell, a microcell, a femtocell, a picocell, and/or a computing device capable of acting as a wireless "hotspot" that enables connectivity to the network. Accordingly, the scale and coverage area of various types of access points are not limited to the examples discussed. Access points may work alone or in concert with one another, locally or remotely.

"Cell site" is generally used herein to refer to a defined wireless communications coverage area (i.e., a geographic area) serviced by an access point or a plurality of neighboring access points working together to provide a single coverage area. Also, it will be understood that one access point may control one cell site/coverage area, or, alternatively, one access point may control multiple cell sites/coverage areas.

"User equipment" (UE), "user device," "mobile device," and "wireless communication device" are used interchangeably to refer to a device having hardware and software that is employed by a user in order to send and/or receive electronic signals/communication over one or more networks, whether terrestrial or aerospace. User devices generally include one or more antennas coupled to a radio for exchanging (e.g., transmitting and receiving) transmissions with an in-range base station that also has an antenna or antenna array. In aspects, user devices may constitute any variety of devices, such as a personal computer, a laptop computer, a tablet, a netbook, a mobile phone, a smartphone, a personal digital assistant, a wearable device, a fitness tracker, or any other device capable of communicating using one or more resources of the network. User devices may include components such as software and hardware, a processor, a memory, a display component, a power supply or power source, a speaker, a touch-input component, a keyboard, and the like. In various examples or scenarios that may be discussed herein, user devices may be capable of using 5G technologies with or without backward compatibility to prior access technologies, although the term is not limited so as to exclude legacy devices that are unable to utilize 5G technologies, for example.

The terms "radio," "controller," "antenna," and "antenna array" are used interchangeably herein to refer to one or more software and hardware components that facilitate sending and receiving wireless radio frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas having a length, for example, of ¼, ½, 1, or 1½ wavelengths. The antennas may be monopole, loop, parabolic, traveling-wave, aperture, Yagi-Uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

The term "Domain Name System (DNS)" refers to a network protocol that operates to, for example, translate human-readable domain names into Internet Protocol addresses for utilization by computing devices.

Additionally, it will be understood that sequential or relative terms such as "first," "second," "third," "primary," and/or "secondary" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Overview

Aspects herein include a system, method, and media for reducing latency when implementing Oblivious Domain Name System traffic over Hypertext Transfer Protocol Secure (ODOH) in a telecommunications network, without requiring a separate and/or dedicated intermediary proxy device. Other technologies require a dedicated intermediary proxy device when implementing Oblivious Domain Name System traffic over Hypertext Transfer Protocol Secure. In contrast, aspects herein implement ODOH by "collapsing" operations that would otherwise be performed by a dedicated intermediary proxy device into a Network Address Translation (NAT) device operating within a telecommunications network. In some aspects, the NAT device may be incorporated into a gateway in order to reduce latency. In addition, the system, method, and media provided for herein improve digital security by shielding the user's (or a device's) identifying information from third parties, resolvers, and/or other servers. In other words, identifying information in requests originating from a user device can be removed and replaced, such that the identifying information (of the user and/or the user device) is protected and cannot be viewed, extracted, or otherwise obtained by third parties, resolvers, and/or other servers. At the same time, the system, method, and media provided for herein prevents the mobile network operator from being able to identify the domain name that is being requested (e.g., Facebook, YouTube, etc.) by the user, via the user device. As such, the user's digital privacy is significantly improved and negative impacts on latency are reduced.

Beginning with FIG. 1, a system environment 100 is depicted, in accordance with an embodiment of the present disclosure. It will be understood by those of ordinary skill in the art that the system environment 100 is just one example of a suitable environment for implementing systems, media, and methods described herein that is not intended to limit the scope of use or functionality of the present disclosure. The example system environment 100 is simplified to illustrate devices, components, and modules in merely one of many suitable configurations and arrangements, such that configurations and arrangements of devices, components, and modules relative to one another, as well as the quantity of each of the devices, components, and modules, can vary from what is depicted (e.g., devices, components, and modules may be omitted and/or could be greater in quantity than shown). As such, the absence of components from FIG. 1 should be not be interpreted as limiting the present disclosure to exclude additional components and combination(s) of components. Similarly, the system environment 100 should not be interpreted as imputing any dependency between devices, components, and modules, and nor should it be interpreted as imputing any requirements with regard to each of the devices, components, modules, and combination(s) of such, as illustrated in FIG. 1. Also, it will be appreciated by those having ordinary skill in the art that the connections illustrated in FIG. 1 are also examples as other methods, hardware, software, and devices for establishing a communications link between the components, devices, systems, and entities, as shown in FIG. 1, may be utilized in implementations of the present disclosure. Although the connections are depicted using one or more solid lines, it will be understood by those having ordinary skill in the art that the examples of connections of FIG. 1 may be hardwired or wireless, and may use intermediary components that have been omitted or not included in FIG. 1 for simplicity's sake.

As shown in FIG. 1, the system environment 100 includes a carrier device associated with a Mobile Network Operator (MNO) of a telecommunications network, and thus, is operating within the telecommunications network. The carrier device may be a Network Address Translation (NAT) device 102 in some aspects. A NAT device is discussed hereinafter for simplicity, but it will be understood that other types of carrier devices may be implemented or leveraged. The NAT device 102 may be optionally integrated within a gateway 104, as shown. The gateway may be, in some instances, a Packet Data Network Gateway (PGW) or a User Plane Function (UPF), or similar gateway functionality, for example. The NAT device 102 and/or the gateway 104 may be located within an edge network 106 of a telecommunications network, a core network 108 of the telecommunications network, or a hybrid network formed therefrom. The edge network 106 and the core network 108 are depicted as overlapping in FIG. 1 for simplicity, to indicate that NAT device 102 and/or the gateway 104 could be located in either or a hybrid thereof. The system environment 100 includes a destination 110, such as the Internet. Accordingly, in the system environment 100, a user device 112 may request access to the destination 110 by communicating with an access point 114 that enables connection to and/or that operates within the telecommunications network. The request may travel to the NAT device 102 and onward to a DNS resolver 116. The DNS resolver 116 operates to identify the specific destination 110 that is sought by the request. Once identified, the user device 112 can be provided content and/or a connection to the destination 110 via the telecommunications network.

In various aspects, the NAT device 102 comprises software and hardware, such as a processor and a memory. In some aspects, the NAT device may include a physical device operating alone or within a gateway, whereas in other aspects, the NAT device may be a virtual device running on or hosted by a gateway. The NAT device 102 may leverage non-transitory computer-readable media that locally or remotely store computer-executable instructions that, when executed by a processor, cause the NAT device 102 to perform computerized functions as further described hereinafter. The NAT device 102 may be configured to, for example, receive a Domain Name System (DNS) request from the user device 112. The DNS request may be communicated from the user device 112, via the access point 114, to the NAT device 102 using Hypertext Transfer Protocol Secure (HTTPS). Based on and/or in response to receipt of the DNS request, the NAT device 102 may generate a modified Domain Name System request. The modified DNS request may be generated by applying a many-to-one translation, for example, to a source IP address that is associated with the user device to the original DNS request or data therein. For example, a many-to-one translation may conceal multiple private IP addressed behind a single public IP address. In another example involving a PAT device/gateway, the modified DNS request may be generated by applying a PAT to the source IP address that is associated with the user device to the original DNS request or data therein.

In one example, a header of the original DNS request that contains the source IP address in unencrypted, while the packet payload of the original DNS request is encrypted. The NAT Device may modify, replace, or change a first Internet Protocol (IP) address that is specified in the DNS request to a second IP address that is different from the first IP address. In one example, the NAT device 102 may modify, replace, or change a source IP address that corresponds to the user device in the DNS request to a NAT device IP address. Although the NAT device IP address is discussed in aspects herein, it will be understood from this Description that other IP addresses, such as an IP pool or IP range are contemplated and may be utilized instead of a particular NAT device's IP address, which is merely one example discussed herein for simplicity and brevity. Thus the term "NAT device IP address" may be used herein to include the specific, physical public IP address of the NAT device or any IP address in a range of public IP addresses (a "NAT pool") that are not physically operating on the NAT Device but which are used for the purpose of assigning new source IPs for relevant traffic flows.

As such, the source IP address that may be usable to third parties to identify the specific user device from which the original DNS request was received is replaced with an IP address that is specific to the NAT device. As such, the modified DNS request can no longer be used by third parties to identify the specific user device (e.g., user device 112) from which the DNS request was received. Instead the NAT device 102 is identifiable as the "source IP address" within the modified DNS request, thus hiding the identity of the specific user device.

The NAT device may communicate the modified DNS request to the DNS resolver 116. The modified DNS request may be communicated directly from the carrier device to the Domain Name System resolver operating with Domain Name System over HTTPS protocol without an intermediary proxy device, in some aspects. In other aspects, the modified DNS request may be communicated to the Domain Name System resolver through an intermediary proxy device operating with Domain Name System over HTTPS protocol.

The DNS resolver 116 may be hosted by a carrier device using Oblivious Domain Name System Over HTTPS (ODOH) protocol or may be hosted by a vendor device using ODOH protocol. Using the modified DNS request, the DNS resolver 116 may identify a destination IP address that identifies the particular destination (e.g., a website, an online service, etc.) sought by the modified DNS request. The DNS resolver 116 uses a human-readable alphanumeric string (e.g., "www.pbs.com") that identifies the destination within the modified DNS request, and identifies a particular machine-readable IP address that corresponds to the human-readable alphanumeric string, and thus, to the destination being requested. In general, the DNS resolver 116 may communicate with a root name server 118, a top-level domain (TLD) name server 120, and an authoritative name server 122 in order to identify the particular destination sought by the modified DNS request. The DNS resolver 116 cannot identify the user device 112 from the modified DNS request, and thus the identity of the user device 112 (and corresponding user) remains anonymous and protected. The DNS resolver 116 generates a DNS response that includes the IP address that is specific to the destination that it has identified using the alphanumeric string from the modified DNS request.

The DNS response can then be sent to the NAT device 102. Because the modified DNS request specified the NAT device IP address as the source IP address (i.e., the source device sending the modified DNS request), the DNS resolver 116 communicates the DNS response and specifies the NAT device IP address as the destination IP address for the DNS response, in reply to the modified DNS request. As such, the NAT device 102 receives the DNS response from the DNS resolver 116.

The NAT device 102 generates a modified DNS response from the DNS response it receives from the DNS resolver 116. In some aspects, the NAT device 102 modifies, replaces, and/or changes the destination IP address in the original DNS response (which presently specifies the NAT device IP address) so that the modified DNS response will specify the IP address that is associated with the user device 112. For example, the NAT device 102 may generate a modified DNS response by changing the secondIP address (in the received DNS response) back to the first IP address (that corresponds to the user device 112). For example, the NAT device 102 may generate a modified DNS response by changing a destination IP address that corresponds to the NAT device in the DNS response to an IP address associated with the user device 112 (i.e., the source device that sent the original DNS request). In some aspects, the NAT device modifies the destination IP address in the unencrypted header.

Continuing, the NAT device 102 communicates the modified DNS response to the user device 112. The modified DNS response may be communicated to the user device 112 using HTTPS, for example. The IP address that is specified in the modified DNS response may then be used by the user device 112 to access the destination, for example, using a web browser application that inputs the IP address in order to return content from the destination requested.

Figure 2:
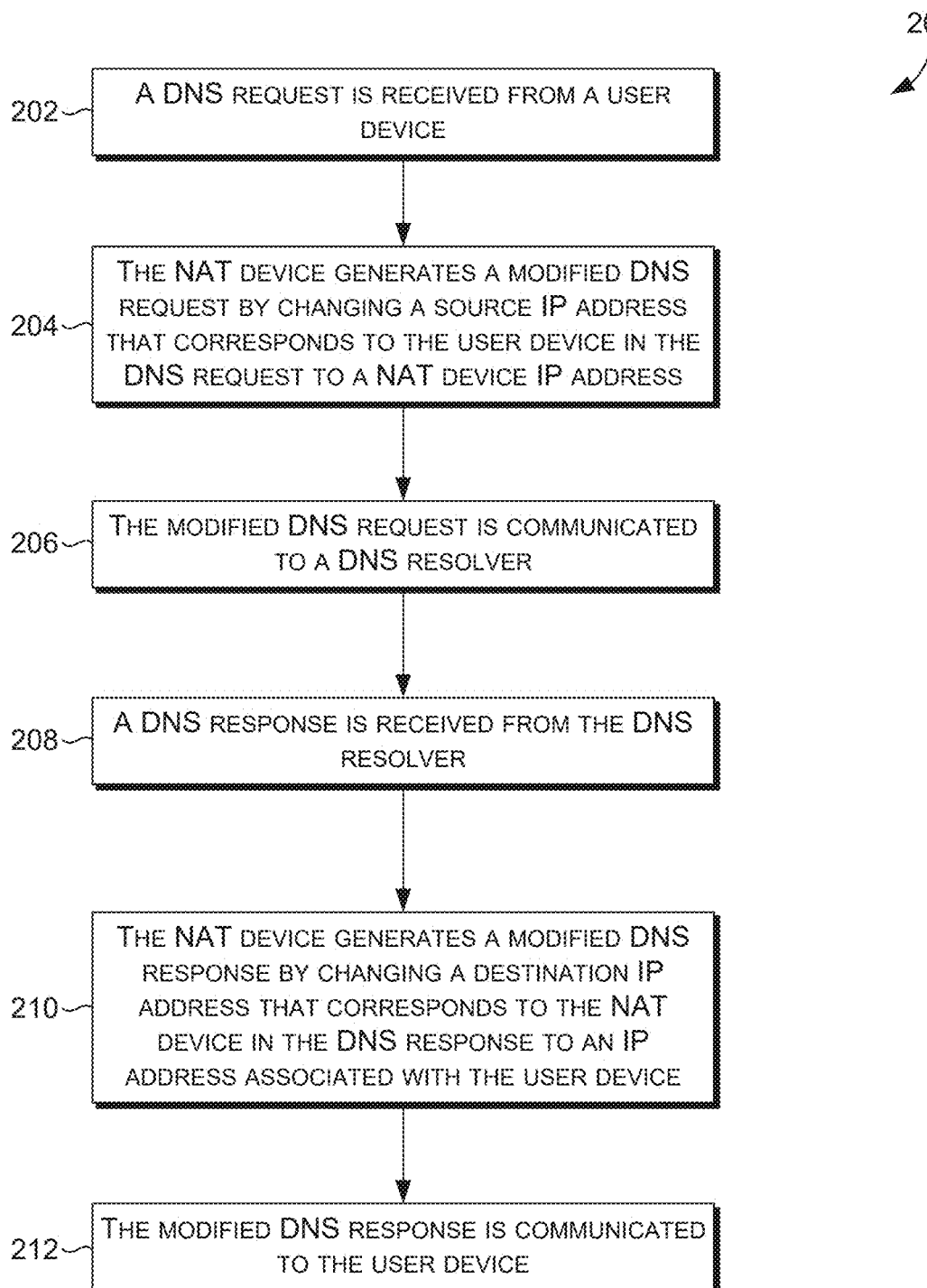
FIG. 2 depicts a flowchart of a method in accordance with one or more aspects.

Turning to FIG. 2, a flowchart of a method 200 is provided. In various aspects, the method 200 can be a computer-implemented method, for example, by one or more components shown in FIG. 1. In some aspects, one or more non-transitory computer-readable storage media having computer-readable instructions or computer-readable program code portions embodied thereon, for execution via one or more processors, can be used to implement and/or perform the method 200. For example, computer-readable instructions or computer-readable program code portions can specify the performance of the method 200, can specify a sequence of steps of the method 200, and/or can identify particular component(s) of software and/or hardware for performing one or more of the steps of the method 200, in aspects. The computer-readable instructions or computer-readable program code portions can correspond to an application and/or an application programming interface (API), in some embodiments. In one embodiment, the application or API can implement and/or perform the method aspects. As discussed below, the method 200 can be performed using software, hardware, component(s), and/or device(s) depicted in the example of FIG. 1. In aspects, the method 200 may be performed by the monitoring system 102 of FIG. 1.

At block 202, a DNS request is received from a user device. At block 204, the NAT device (or other carrier device) generates a modified DNS request by changing a source IP address that corresponds to the user device in the DNS request to a NAT device IP address. At block 206, the modified DNS request is communicated to a DNS resolver. At block 208, a DNS response is received from the DNS resolver. At block 210, the NAT device generates a modified DNS response by changing a destination IP address that corresponds to the NAT device in the DNS response to an IP address associated with the user device. At block 212, the modified DNS response is communicated to the user device.

In some examples, the NAT device or other carrier device (such as an access point) may determine that the user device supports Domain Name System over HTTPS protocol. In such an example, a DNS configuration may be communicated and/or pushed to the user device in response to the user device connecting to the telecommunications network. The DNS configuration causes the user device to utilize ODOH protocol, for example, when communicating a DNS request to the NAT device, as discussed with regard to FIGS. 1 and 2.

Figure 3:
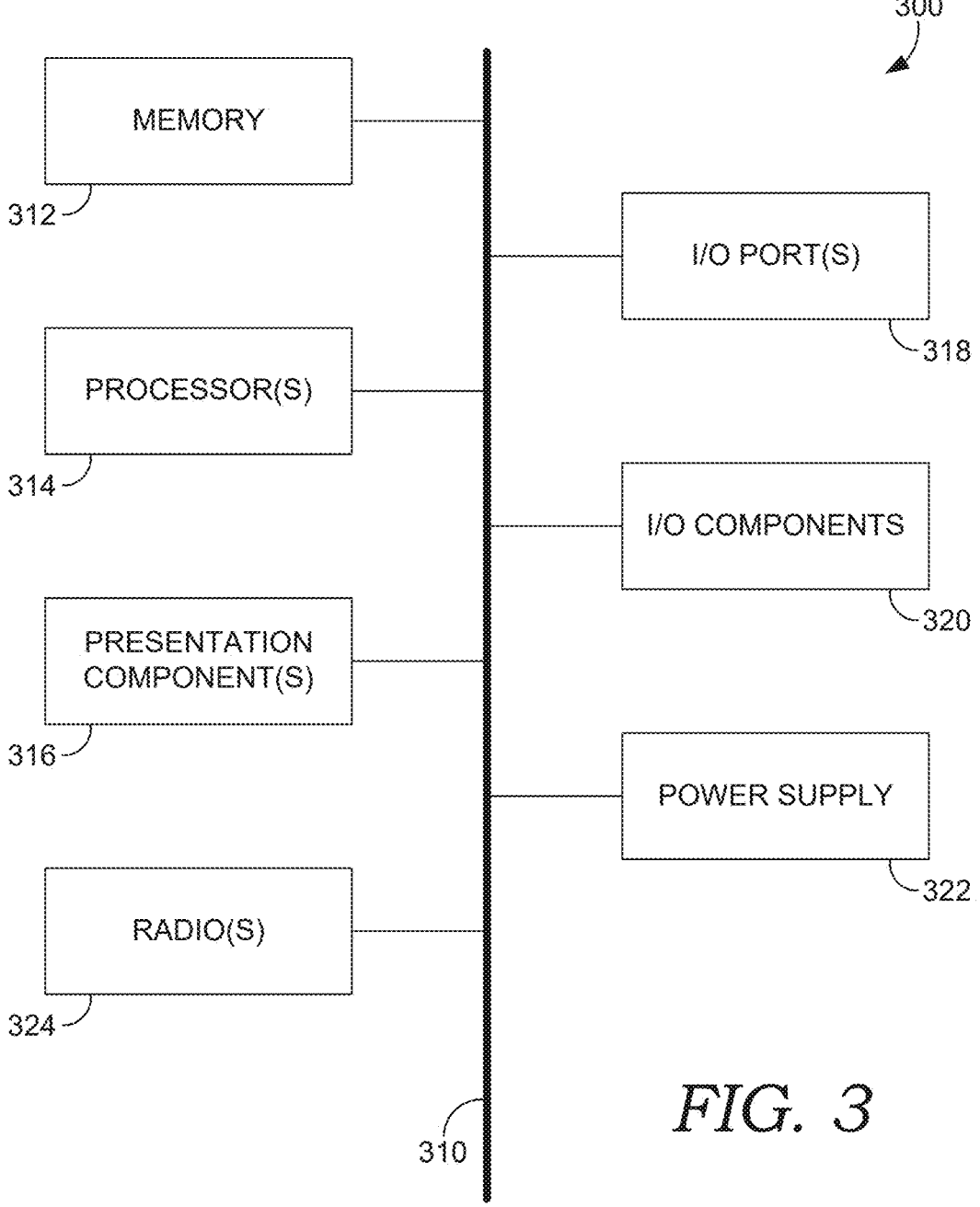
FIG. 3 depicts a simplified block diagram of an example device that is suitable for implementing one or more aspects discussed herein.

FIG. 3 depicts a simplified block diagram of an example device 300 that is suitable for implementing one or more aspects discussed herein. The device 300 is but one example of a suitable computing environment and is not intended to suggest any limitation as to the scope of use or functionality of the disclosure, and nor should the device 300 be interpreted as having any dependency or requirement relating to any one or combination of components illustrated.

The implementations of the present disclosure may be described in the general context of computer code or machine-useable instructions, including computer-executable instructions such as program components being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 3, the device 300 includes bus 302 that directly or indirectly couples with the following devices: memory 304, one or more processors 306, one or more presentation components 308, input/output (I/O) ports 310, I/O components 312, and power supply 314. Bus 302 represents what may be one or more buses (such as an address bus, data bus, or combination thereof). Although the devices of FIG. 3 are shown with lines for the sake of clarity, in reality, delineating various components is not so clear, and metaphorically, the lines would more accurately be grey and fuzzy. For example, one may consider a presentation component such as a display device to be one of I/O components 312. Also, processors, such as one or more processors 306, have memory. Distinction is not made between such categories as "workstation," "server," "laptop," "handheld device," etc., as all are contemplated within the scope of FIG. 3 and refer to "computer" or "computing device."

The device 300 typically includes a variety of computer-readable media. Computer-readable media can be any available media that can be accessed by the device 300 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, digital versatile disks (DVDs) or other optical disk storage, magnetic cassettes, magnetic tape, and magnetic disk storage or other magnetic storage devices. Computer storage media does not comprise a propagated data signal.

Communication media typically embodies computer-readable instructions, data structures, program modules or other data in a modulated data signal (such as a carrier wave or other transport mechanism), and includes any information delivery media. The term "modulated data signal" indicates a signal that has one or more of its characteristics set or changed in such a manner so as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 304 includes computer storage media in the form of volatile and/or non-volatile memory. Memory 304 may be removable, non-removable, or a combination thereof. Examples of memory include solid-state memory, hard drives, optical disc drives, etc. The device 300 includes one or more processors 306, which read data from various entities such as bus 302, memory 304, or I/O components 312. One or more presentation components 308 present data indications to a person or other device. Examples of one or more presentation components 308 include a display device, speaker, printing component, vibrating component, etc. The I/O ports 310 allow the device 300 to be logically coupled to other devices including I/O components 312, some of which may be built into the device 300. The example I/O components 312 include a microphone, joystick, game pad, satellite dish, scanner, printer, wireless device, etc.

Radio 316 represents a radio that facilitates communication with a wireless telecommunications network (e.g., 2G, 3G, 4G, 5G, and forwarding looking architectures such as 6G, 7G). Illustrative wireless telecommunications technologies include CDMA, GPRS, TDMA, GSM, and the like. Radio 316 might additionally or alternatively facilitate other types of wireless communications including Wi-Fi, WiMAX, LTE, or other VoIP communications. As can be appreciated, in various aspects the radio 316 can be configured to support multiple technologies, and/or multiple radios can be utilized to support multiple technologies. A wireless telecommunications network might include an array of devices, which are not shown so as to not obscure more relevant aspects of the disclosure. Components such as a base station, a communications tower, or even access points (as well as other components) can provide wireless connectivity in some aspects.

Regarding FIGS. 1 through 3, it will be understood by those of ordinary skill in the art that the environment(s), system(s), and/or methods(s) depicted are not intended to limit the scope of use or functionality of the present aspects. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated in the figures are contemplated to potentially include methods, hardware, software, and/or other devices for establishing a communications link between the components, devices, systems, and/or entities, as may be utilized in implementation of the present aspects. As such, the absence of component(s) and/or steps(s) from the figures should not be interpreted as limiting the present aspects to exclude additional component(s) and/or combination(s) of components. Moreover, though devices and components in the figures may be represented as singular devices and/or components, it will be appreciated that some aspects can include a plurality of devices and/or components such that the figures should not be considered as limiting the number of a devices and/or components.

Many different arrangements of the various components depicted, as well as components not shown, are possible without departing from the scope of the claims below. Aspects of our technology have been described with the intent of being illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method comprising:
receiving a Domain Name System (DNS) request from a user device, wherein the DNS request is a DNS-over-HTTPS or Oblivious DoH message;
generating, at a carrier device, a modified Domain Name System request;
communicating the modified DNS request directly from the carrier device to a DNS resolver without an intermediary proxy device;
in response to the modified DNS request, receiving a DNS response from the DNS resolver;
generating, at the carrier device, a modified DNS response; and
communicating the modified DNS response from the carrier device to the user device.

2. The computerized method of claim 1, wherein generating the modified DNS request at the carrier device comprises changing a first Internet Protocol (IP) address in the DNS request to a second IP address that is different from the first IP address.

3. The computerized method of claim 2, wherein generating the modified DNS response at the carrier device comprises changing the second IP address in the DNS response to the first IP address.

4. The computerized method of claim 1, wherein the carrier device is a Network Address Translation (NAT) device operating within a telecommunications network, and wherein generating the modified DNS request at the carrier device comprises changing a source IP address that corresponds to the user device in the DNS request to a NAT device IP address.

5. The computerized method of claim 4, wherein generating the modified DNS response at the carrier device comprises changing a destination IP address that corresponds to the NAT device in the DNS response to an IP address associated with the user device.

6. One or more non-transitory computer-readable media storing instructions that when executed via one or more processors perform a computerized method, the instructions stored on the one or more non-transitory computer-readable media comprising:
receiving a Domain Name System (DNS) request from a user device, wherein the DNS request is a DNS-over-HTTPS or Oblivious DoH message;
generating, at a Network Address Translation (NAT) device, a modified DNS request by changing a source Internet Protocol (IP) address that corresponds to the user device in the DNS request to a NAT device IP address;
communicating the modified DNS request directly to a DNS resolver without an intermediary proxy device;
receiving a DNS response from the DNS resolver;
generating, at the NAT device, a modified DNS response by changing a destination IP address that corresponds to the NAT device in the DNS response to an IP address associated with the user device; and
communicating the modified DNS response to the user device.

7. The media of claim 6, the instructions comprising, when generating the modified DNS request, modifying a header that contains the source IP address while maintaining encryption of a packet payload of the DNS request.

8. The media of claim 6, the instructions comprising, when generating the modified DNS response, modifying a header that contains the destination IP address while maintaining encryption of a packet payload of the DNS response.

9. The media of claim 6, the instructions comprising determining that the user device supports the DNS over Hypertext Transfer Protocol Secure (HTTPS) protocol.

10. The media of claim 9, the instructions comprising communicating a DNS configuration to the user device in response to the user device connecting to a telecommunications network.

11. The media of claim 10, wherein the Domain Name System configuration causes the user device to utilize DNS over HTTPS protocol.

12. A system comprising:
at least one processor; and
one or more computer storage media storing instructions thereon that, when executed by the at least one processor, cause the at least one processor to perform operations comprising:
receiving, over Hypertext Transfer Protocol Secure (HTTPS), a Domain Name System (DNS) request from a user device, wherein the DNS request is a DNS-over-HTTPS or Oblivious DoH message;
generating a modified DNS request by applying a many-to-one translation to a source IP address that is associated with the user device;
communicating the modified DNS request directly to a DNS resolver without an intermediary proxy device;
receiving a DNS response from the DNS resolver;
generating a modified DNS response; and
communicating, over HTTPS, the modified DNS to the user device.

13. The system of claim 12, wherein the gateway device is configured to perform Network Address Translation, Port Address Translation, or a combination thereof, within a telecommunications network.

14. The system of claim 13, wherein the gateway is a Packet Data Network Gateway (PGW) or a User Plane Function (UPF).

15. The system of claim 12, wherein the DNS resolver is hosted by a carrier-based DNS over HTTPS protocol.

16. The system of claim 12, wherein the DNS resolver is hosted by a vendor-based DNS over HTTPS protocol.

* * * * *